US009932058B2

(12) United States Patent
Holloway et al.

(10) Patent No.: US 9,932,058 B2
(45) Date of Patent: Apr. 3, 2018

(54) SCAFFOLDING TRANSPORT CART

(71) Applicants: Cathy R. Holloway, Pickerington, OH (US); James R. Henderson, Sunbury, OH (US)

(72) Inventors: Cathy R. Holloway, Pickerington, OH (US); James R. Henderson, Sunbury, OH (US)

(*) Notice: Subject to any disclaimer, the term of this patent is extended or adjusted under 35 U.S.C. 154(b) by 0 days.

(21) Appl. No.: 15/292,041

(22) Filed: Oct. 12, 2016

(65) Prior Publication Data
US 2017/0129520 A1 May 11, 2017

Related U.S. Application Data

(60) Provisional application No. 62/240,134, filed on Oct. 12, 2015.

(51) Int. Cl.
B62B 3/10 (2006.01)
B62B 3/02 (2006.01)
B62B 5/00 (2006.01)
B62B 5/06 (2006.01)

(52) U.S. Cl.
CPC .............. B62B 3/10 (2013.01); B62B 3/02 (2013.01); B62B 5/0033 (2013.01); B62B 5/063 (2013.01); B62B 2202/10 (2013.01)

(58) Field of Classification Search
CPC ... B62B 3/10; B62B 3/02; B62B 5/0033; B62B 5/063; B62B 2202/10; B62B 3/00; B62B 3/108; E04G 5/004; E04G 5/00
See application file for complete search history.

(56) References Cited

U.S. PATENT DOCUMENTS

| 4,088,202 A * | 5/1978 | Costello ............... E04G 1/20 180/2.1 |
| 4,901,650 A * | 2/1990 | Armstead ............ B65D 19/08 108/55.1 |
| 5,018,629 A * | 5/1991 | Lamar ................. B65D 19/08 108/53.1 |
| 6,955,384 B1 * | 10/2005 | Good ..................... E04G 5/00 211/49.1 |
| 7,878,338 B2 * | 2/2011 | Maxson ................. E04G 5/00 211/41.15 |
| 2011/0297465 A1 * | 12/2011 | Huntley ................ E04G 1/20 180/65.1 |
| 2015/0028616 A1 * | 1/2015 | Kroening ........... B60B 33/0002 296/3 |

* cited by examiner

Primary Examiner — Brian L Swenson
(74) Attorney, Agent, or Firm — Standley Law Group LLP

(57) ABSTRACT

Scaffolding transport carts for transporting scaffolding components from a jobsite delivery location to the location of scaffolding erection. Exemplary scaffolding transport cart embodiments may be moved and guided manually, or moved under the power of a motive device but under user control. A fully remote-controlled embodiment may also be provided. In any case, a scaffolding transport cart embodiment may dimensioned such that the scaffolding transport cart can fit through a standard doorway, even when loaded with scaffolding components.

19 Claims, 16 Drawing Sheets

SCAFFOLDING TRANSPORT CART

CROSS-REFERENCE TO RELATED APPLICATIONS

This application claims the benefit of U.S. Provisional Application No. 62/240,134, filed on Oct. 12, 2015, which is hereby incorporated by reference as if fully recited herein.

TECHNICAL FIELD

Exemplary embodiments disclosed herein are directed to carts for transporting scaffolding components to and from a jobsite.

BACKGROUND

Scaffolding is well-known to one of skill in the art in construction and other related trades. The common and numerous uses for scaffolding likely also make scaffolding known to those outside the construction trades—including the general public—as even if a given person has never used scaffolding, they've likely seen it in use by others.

Generally speaking, scaffolding may be described as an erectable structure that can be assembled onsite to provide an elevated platform(s) for supporting workers and/or equipment. For example, scaffolding is commonly employed when building tall concrete block or other walls, during drywall installation, when applying stucco or paint to a building, and in other applications too numerous to mention.

Scaffolding may be of different specific designs. Typically, however, all scaffolding includes frame components that may be temporarily joined to form the primary support system for a scaffolding assembly. Other components may also be present, such as but not limited to, planks on which workers may stand and/or equipment may be supported, base plates, outriggers, cross-braces, screw jacks, and guard railing.

A given scaffolding assembly normally requires a multitude of such components—particularly if the job/structure with which the scaffolding is associated is large. Each of these components must be transported to the location where the scaffolding will be erected, which in some case may be far removed from the closest point reachable by a scaffolding delivery vehicle. Thus, in many cases, each scaffolding component must be transported over a long distance once delivered. If not already understood, it can easily be imagined that many of these components are also large and/or heavy in nature, which makes their transport difficult, particularly if the components must be transported by hand.

Compounding this situation is the fact that at many jobsites, scaffolding components must be transported through narrow doorways, or around obstacles that inhibit or prohibit the use of typical moving equipment, such as without limitation, trucks and forklifts. In these cases, hand transport is almost mandatory, resulting in many back-and-forth trips by workers while frequently hand-carrying heavy and or large components.

There has been heretofore no workable solution to the aforementioned scaffolding component transport problem of which the inventors are aware. Exemplary scaffolding transport cart embodiments disclosed herein remedy this situation.

SUMMARY

Exemplary scaffolding cart embodiments shown and described herein are designed to facilitate the transport of scaffolding components from a delivery location, such as but not limited to, a loading dock or other jobsite delivery area, to a scaffolding erection site that is remote from the delivery location. Various exemplary scaffolding transport cart designs are presented, including a scaffolding transport cart dimensioned to fit through a typical (man) doorway, to a larger scaffolding transport cart dimensioned for over-the-road transport in or on a truck.

One exemplary scaffolding transport cart embodiment is designed for manual use—meaning that the cart is designed to be manually moved and guided, or at least guided manually while movement is provided by an onboard motor or a small, powered tugger or pusher device that may be attached to the cart for that purpose. In the latter case, the scaffolding transport cart may even be fully remotely controlled. A manual use scaffolding transport cart may be of various dimensions and particular design. For example, a manual use scaffolding transport cart may, but is not required to, fit through a typical doorway, as mentioned above. A manual use scaffolding transport cart may be equipped with various hangers, baskets, shelves, etc., that allow the cart to specifically support, retain and transport the plurality of different scaffolding components required to erect a given scaffolding assembly. Other features may also be provided, such as the ability to raise one or both ends of such a scaffolding transport cart in order to clear a doorway threshold, step, or some other impediment to cart movement.

A manual use scaffolding transport cart may be delivered to a jobsite already loaded with scaffolding components. In such a case, the loaded manual use scaffolding transport cart may be removed from a truck or other delivery vehicle, such as by means of a ramp, a forklift, etc., and transported to a scaffolding erection site as described above. Contrarily, one or more empty manual use scaffolding transport carts may be delivered to a jobsite and subsequently loaded with appropriate scaffolding components prior to being transported to a scaffolding erection site as described above.

Another exemplary scaffolding transport cart embodiment is designed for supported use—meaning that the cart is designed to be moved to a scaffolding erection site by another piece of equipment, such as a forklift or other known apparatus capable of transporting carts, containers, etc. A supported use scaffolding transport cart may also be of various dimension and particular design. Typically, a supported use scaffolding transport cart will be larger than a manual use scaffolding transport cart and may find use in larger jobs where there are fewer or no barriers that prevent passage of such a cart. As with a manual use scaffolding transport cart, a supported use scaffolding transport cart may be equipped with various hangers, baskets, shelves, etc., that allow the cart to specifically support, retain and transport the plurality of different scaffolding components required to erect a given scaffolding assembly.

Because of the anticipated size of most exemplary supported use scaffolding transport cart embodiments, it is likely preferable to deliver a supported use scaffolding transport cart to a jobsite already loaded with scaffolding components. In such a case, the loaded supported use scaffolding transport cart may be removed from a truck or other delivery vehicle, such as by means of a forklift, and transported to a scaffolding erection site thereby. Nonetheless, it is also possible that one or more empty supported use scaffolding transport carts may be delivered to a jobsite and subsequently loaded with appropriate scaffolding components prior to being transported to a scaffolding erection site as described above.

In any case, and with any particular exemplary transport scaffolding transport cart embodiment, the transportation of scaffolding components from a delivery location to another, scaffolding erection location, is greatly facilitated in comparison to the manual transportation techniques traditionally employed. Exemplary scaffolding transport cart embodiments disclosed herein permit scaffolding components to be transported more efficiently and in a more ergonomic fashion than has been heretofore possible.

Other aspects and features of the general inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENT(S)

Figure 1:
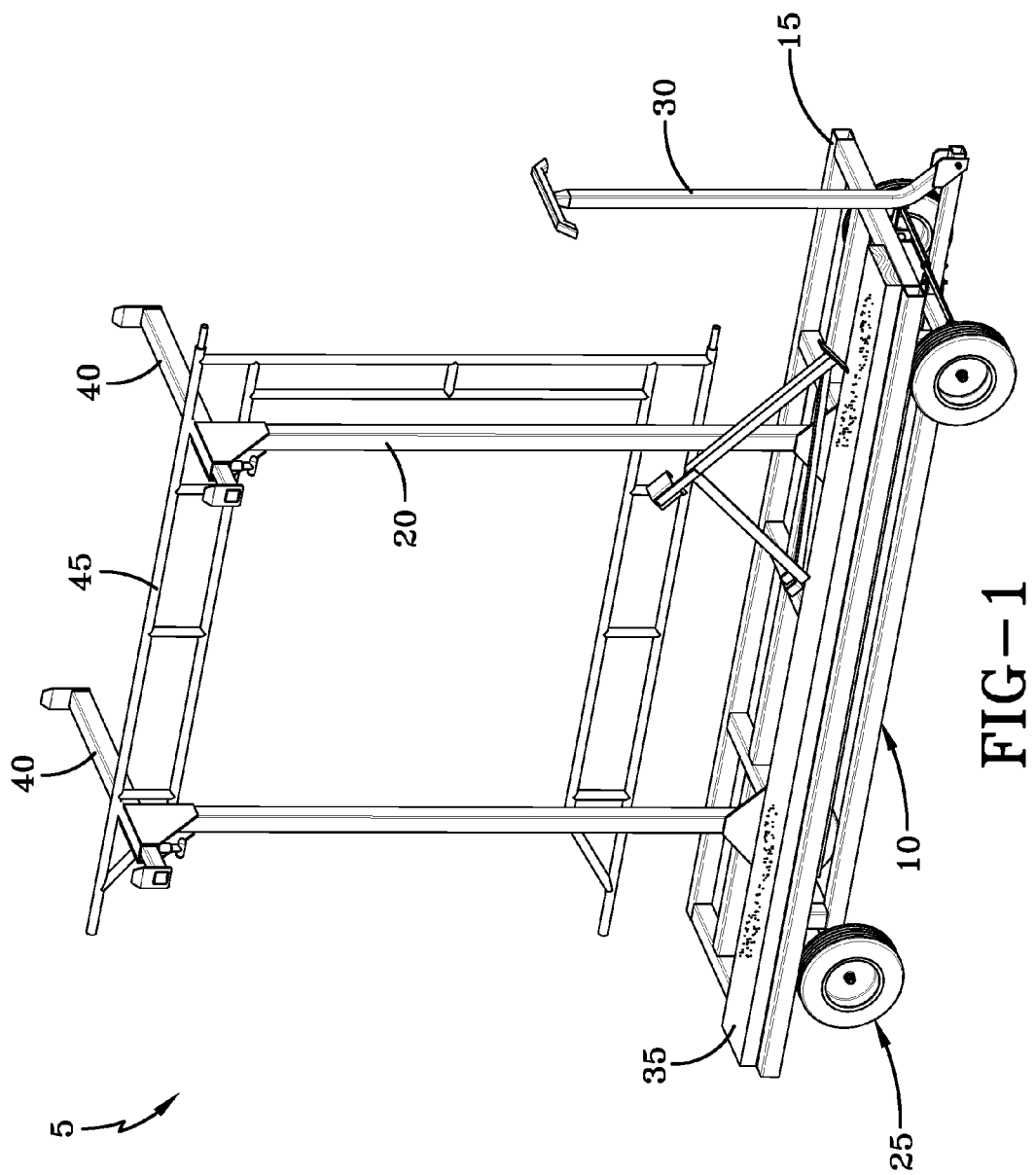
FIG. 1 is an isometric elevation view of one exemplary embodiment of a manual use scaffolding transport cart.
Figure 2:
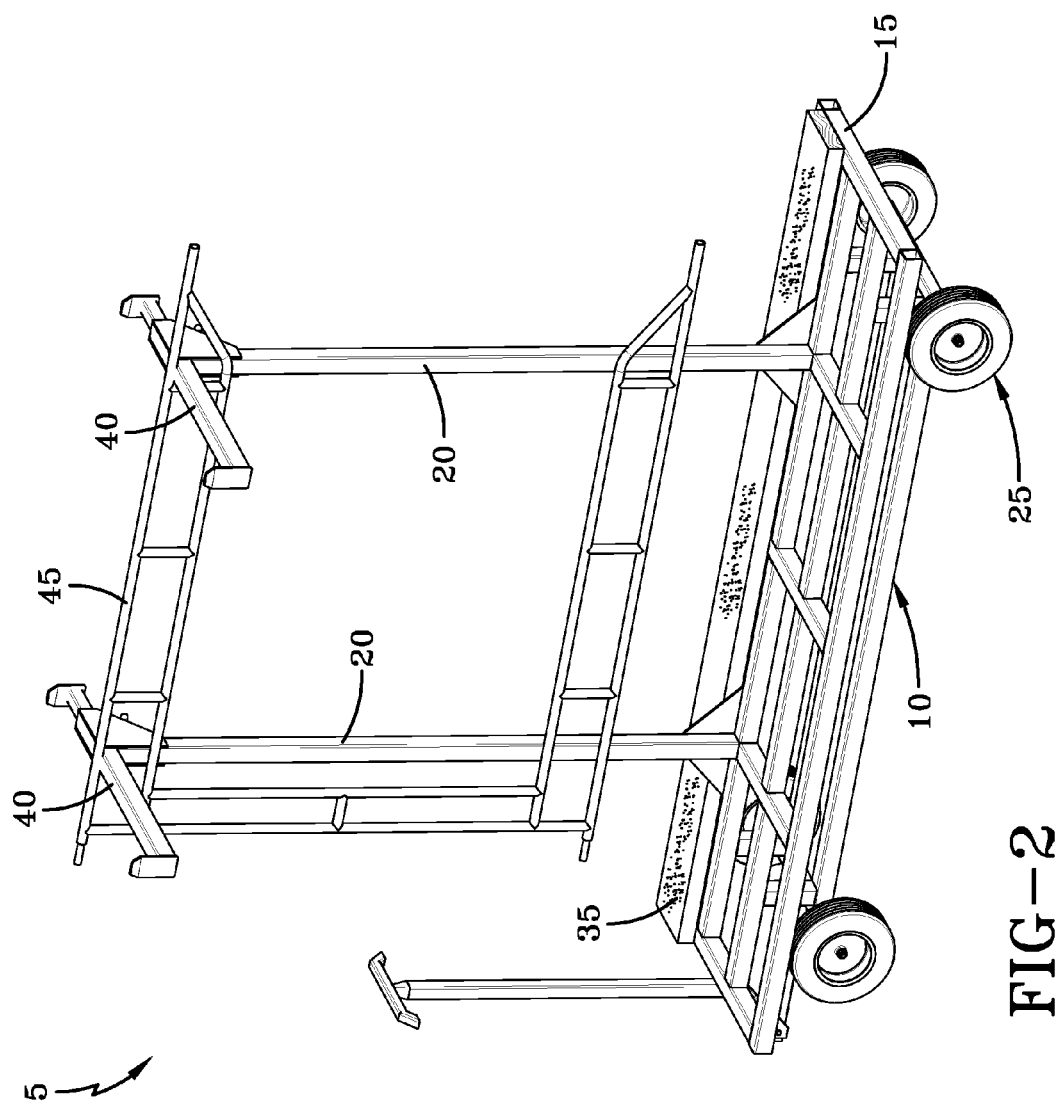
FIG. 2 is a reverse isometric elevation view of the scaffolding transport cart of FIG. 1.
Figure 3:
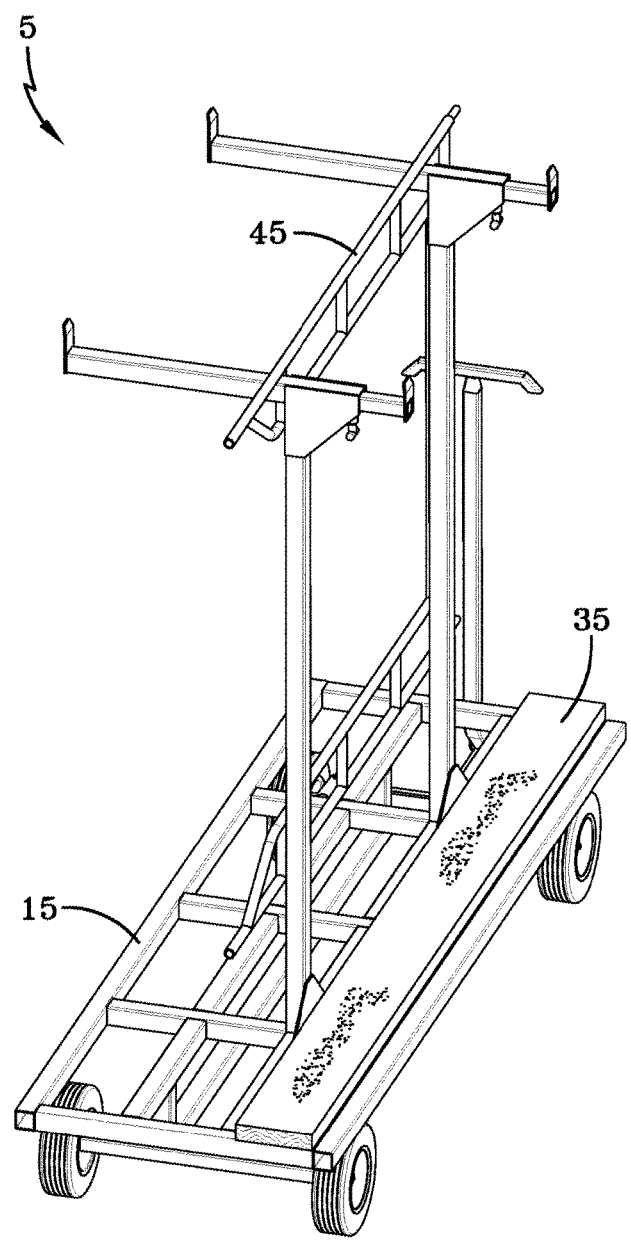
FIG. 3 is an isometric end view of the scaffolding transport cart of FIG. 1.
Figure 4:
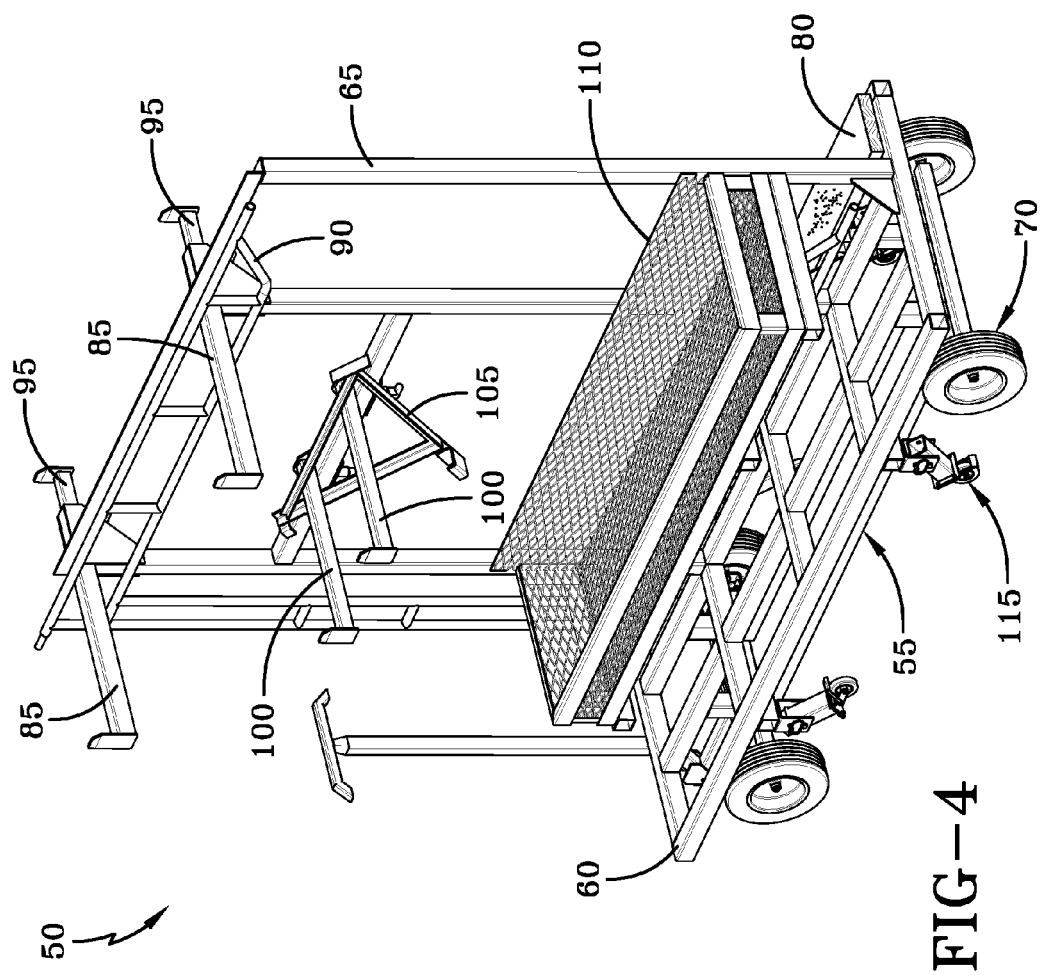
FIG. 4 is an isometric elevation view of another exemplary embodiment of a manual use scaffolding transport cart.
Figure 5:
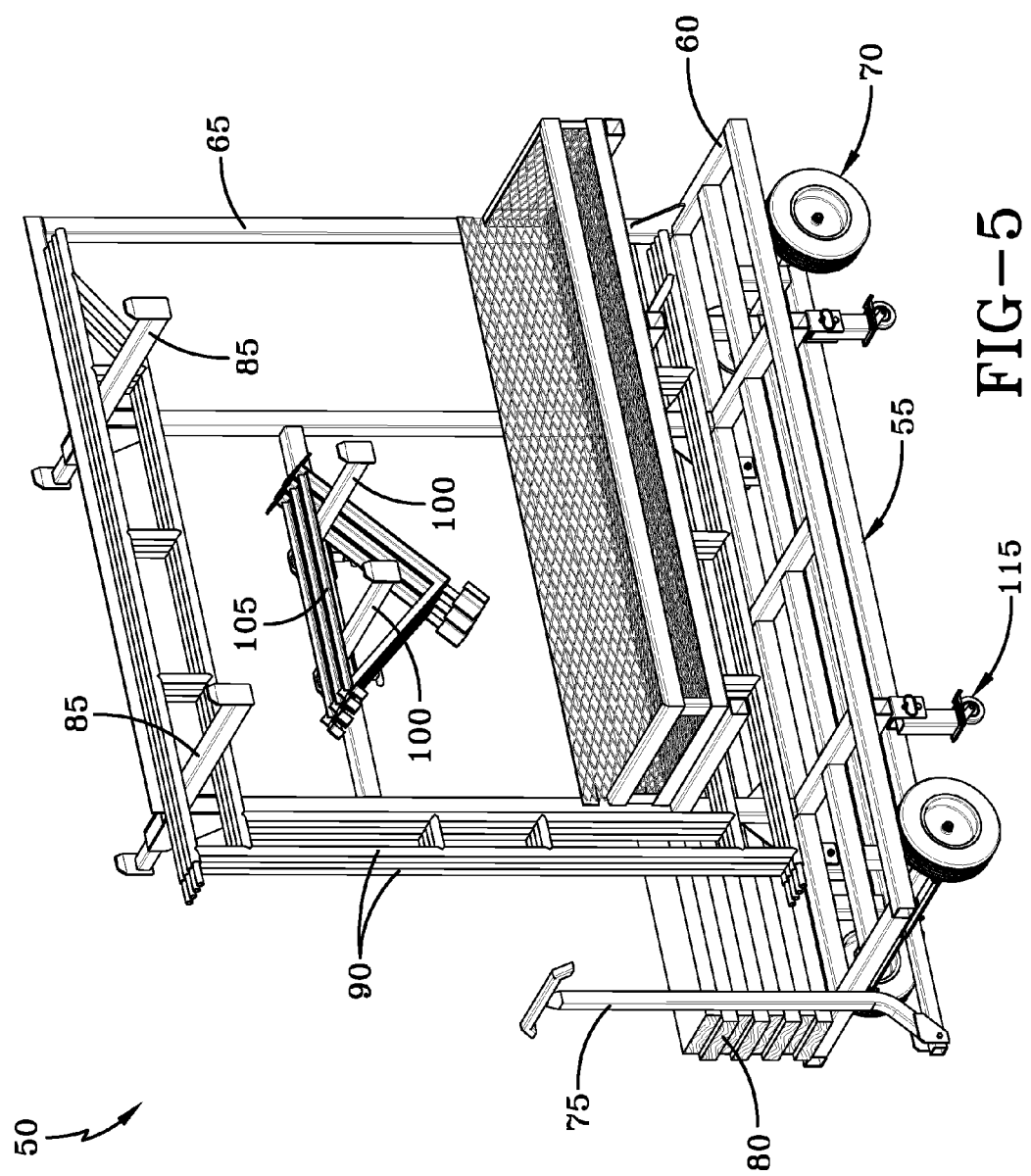
FIG. 5 depicts the scaffolding transport cart of FIG. 4 in a more fully loaded state.
Figure 6:
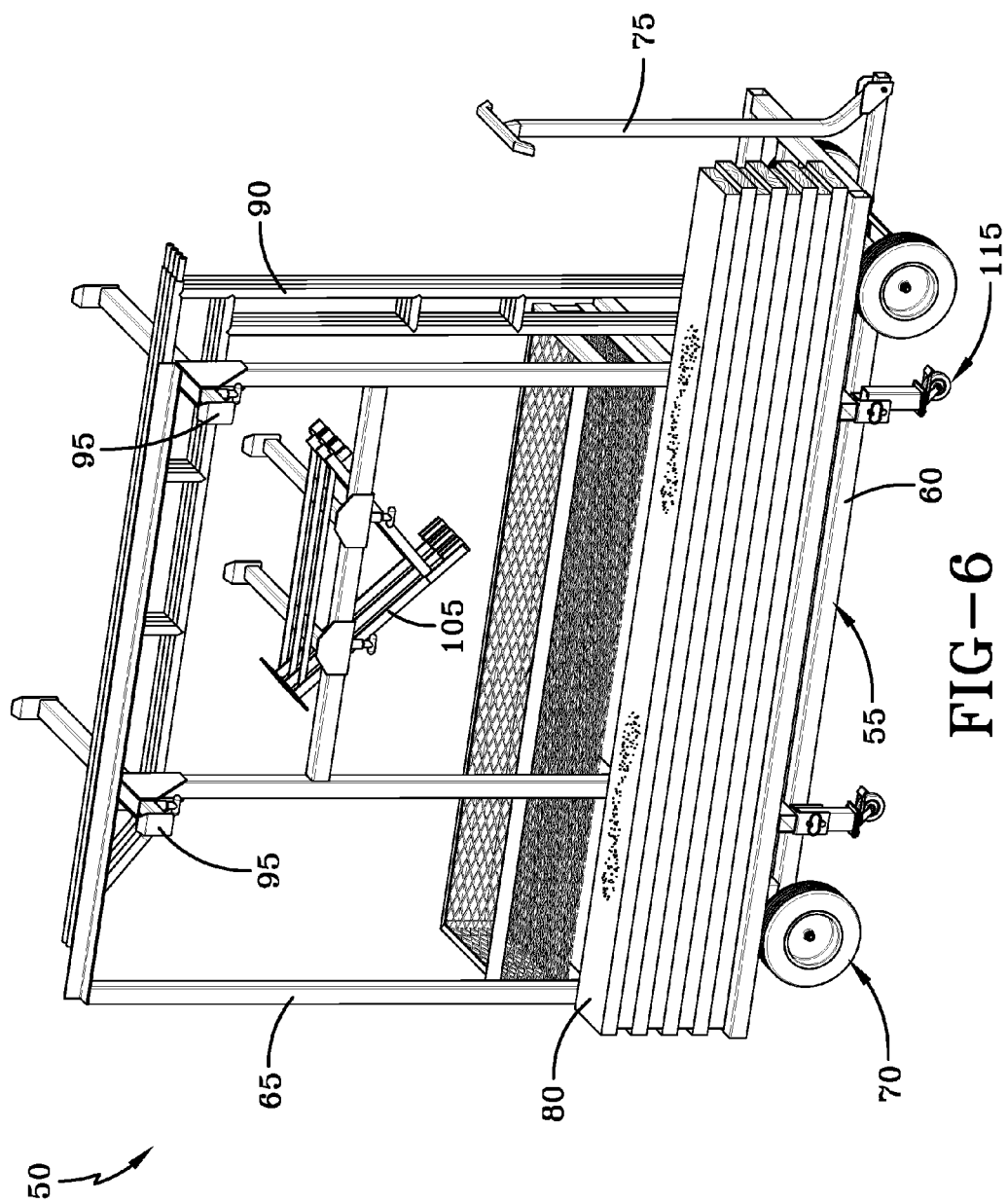
FIG. 6 is a reverse isometric elevation view of the scaffolding transport cart of FIG. 5.
Figure 7:
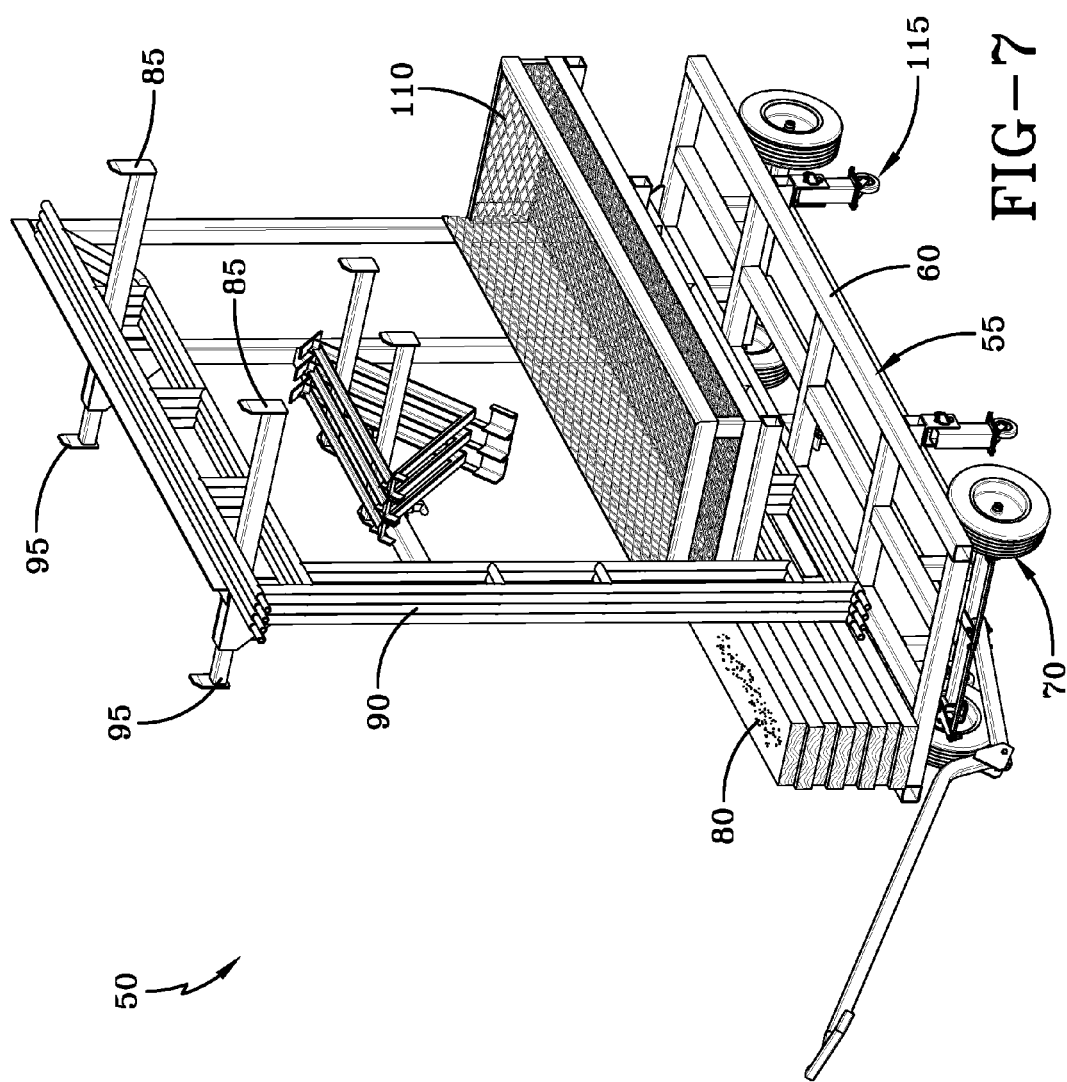
FIG. 7 is an isometric end view of the scaffolding transport cart of FIG. 5.

One exemplary embodiment of a scaffolding transport cart 5 is illustrated in FIGS. 1-3. This particular scaffolding transport cart design is referred to herein as a manual use scaffolding cart—meaning only that the cart is designed to be moved and guided, or at least guided, by a user of the cart.

As shown, the scaffolding transport cart 5 generally has a framework 10 that includes a substantially horizontally-oriented base frame 15, and an upright frame 20 that is supported on and extends upward from the base frame. This exemplary scaffolding transport cart 5 is designed to fit through a typical (man) doorway even when loaded, which is reflected in the cart dimensions.

To the base frame 15 are also attached a plurality of motion facilitation elements which, in this case, are comprised of four wheel and tire assemblies 25 connected to axles. The wheel and tire assemblies 25 allow for easy movement of the scaffolding transport cart 5. While wheel and tire assemblies are employed in this exemplary embodiment, other embodiments are not limited thereto. For example, depending on the surface over which a given scaffolding transport cart will pass, the wheel and tire assemblies could be replaced with tracks, skis, etc.

This exemplary scaffolding transport cart embodiment 5 also includes a handle 30 that facilitates user movement and steering of the cart. The handle may be attached to various points on the scaffolding transport cart 5, but is attached to the base frame 15 in this particular example. Other devices for facilitating user movement of a scaffolding transport cart may be employed in other embodiments.

While not shown in the drawing figures, it is to be understood that other scaffolding transport cart embodiments may be powered in nature, or may be associated with separate powered motive devices. That is, some scaffolding transport cart embodiments may include an engine or motor and appropriate power source, and an associated drive means, that provides for movement of the cart under user control. In still other embodiments, a scaffolding transport cart may be adapted for releasable connection to a separate device, such as a powered tugger or pusher, or to some other motorized device or vehicle that can produce a desired movement of the cart and then be disconnected therefrom when desired. In such a case, a scaffolding transport cart may be adapted in any known manner for connection to such a secondary device. Scaffolding transport carts may also be adapted for connection to each other, such that a train of carts may be moved at once.

Both the base frame 15 and the upright frame 20 of the scaffolding transport cart 5 are particularly adapted to support, retain and transport various scaffolding components. For example, referring to FIGS. 1-3, it can be seen that the base frame 15 of the scaffolding transport cart is designed to receive and support scaffolding planks 35, which may be used in a scaffolding assembly as described above. Referring to FIGS. 1-2 in particular, it can be observed that the upright frame 20 is provided with substantially horizontally-oriented frame hanging arms 40 from which scaffolding frame sections may be hung. The plank storage space on the base frame 15, as well as the height and horizontal separation of the frame hanging arms 40 is selected specifically to permit the support and retention of the scaffolding components associated therewith. Similarly, the dimensions of the base frame 15 and the extension distance of the frame hanging arms 40 is selected such that the scaffolding transport cart 5 will fit through a doorway even when fully loaded with scaffolding components.

Another exemplary scaffolding transport cart embodiment 50 is illustrated in FIGS. 4-8. This scaffolding transport cart 50 is also of the manual use variety—meaning that the cart is again designed to be moved and guided, or at least guided, by a user of the cart. Like the exemplary scaffolding transport cart 5, this scaffolding transport cart 50 is also designed to fit through a typical doorway even when loaded.

The scaffolding transport cart 50 of FIGS. 4-8 generally has a framework 55 that is similar to the framework 10 of the scaffolding transport cart 5 of FIGS. 1-3. That is, the scaffolding transport cart 50 again includes a substantially horizontally-oriented base frame 60, and an upright frame 65 that is supported on and extends upward from the base frame.

To the base frame 60 are also attached a plurality of wheel and tire assemblies 70 connected to axles, which allow for easy movement of the scaffolding transport cart 50. As with the scaffolding transport cart 5, the wheel and tire assemblies 70 of this exemplary scaffolding transport cart embodiment could be replaced with tracks, skis, etc., in other embodiments This exemplary scaffolding transport cart embodiment 50 may also again include a handle 75 that facilitates user movement and steering of the cart. The handle may be attached to various points on the scaffolding transport cart 50, but is attached to the base frame 60 in this particular example. Other devices for facilitating user movement of a scaffolding transport cart may be employed in other embodiments.

Furthermore, the scaffolding transport cart 50 may be powered in nature, such as by a motor or engine, an appropriate power source, and an associated drive means, that provides for movement of the cart under user control. The scaffolding transport cart 50 may alternatively be adapted for releasable connection to a secondary device, such as a powered tugger or pusher, or to some other powered device or vehicle that can produce a desired movement of the cart and then be disconnected therefrom, as described above.

Both the base frame 60 and the upright frame 65 are again particularly adapted to support, retain and transport various scaffolding components. In this exemplary embodiment, it can be seen that the base frame 60 of the scaffolding transport cart 50 is again designed to receive and support scaffolding planks 80, which may be used in a scaffolding assembly as described above. It can also be observed that the upright frame 65 is again provided with substantially horizontally-oriented frame hanging arms 85 from which scaffolding frame sections 90 may be hung. Unlike the exemplary embodiment of FIGS. 1-3, however, this exemplary scaffolding transport cart 50 also includes a second set of frame hanging arms 95 that extend from the opposite side of the upright frame 65 and in an opposite direction to that of the first set of frame hanging arms 85. Consequently, this exemplary scaffolding transport cart can support scaffolding frame sections 90 along both sides of the upright frame 65 (see FIG. 5).

The exemplary scaffolding transport cart 50 is further equipped with a set of outrigger hanging arms 100 from which scaffolding outriggers 105 may be hung. Likewise, the exemplary scaffolding transport cart 50 is also equipped with a basket 110 that can be used to store any of a variety of scaffolding components and/or other items, such as but not limited to safety pins, tie wire, etc.

The plank storage space on the base frame 60, the height and horizontal separation of the frame hanging arms 85, 95, and the height and arrangement of the outrigger hanging arms 100, is selected specifically to permit the support and retention of the scaffolding components associated therewith. Similarly, the dimensions of the base frame 60, and the extension distance of the frame hanging arms 85, 95 and outrigger hanging arms 100 is selected such that the scaffolding transport cart 50 will fit through a doorway even when fully loaded with scaffolding components.

As can be observed in at least FIGS. 4-7, this exemplary scaffolding transport cart 50 is also equipped with a set of extendable wheels or casters 115 that underlie the base frame 60. In this example, the casters 115 are located between the wheel and tire assemblies 70. The casters 115 may be extended to raise the height of the base frame 60 to a level at which the tires of the wheel and tire assemblies 70 are no longer in contact with the ground. As a result, the scaffolding transport cart 50 may thereafter be rotated in a tight circle about the central axis of the caster arrangement. This feature may be beneficial, for example, in tight areas where otherwise rotating the scaffolding transport cart 50 would be difficult. The same or a similar feature may also be provided on the scaffolding transport cart 5 of FIGS. 1-3.

Figure 8:
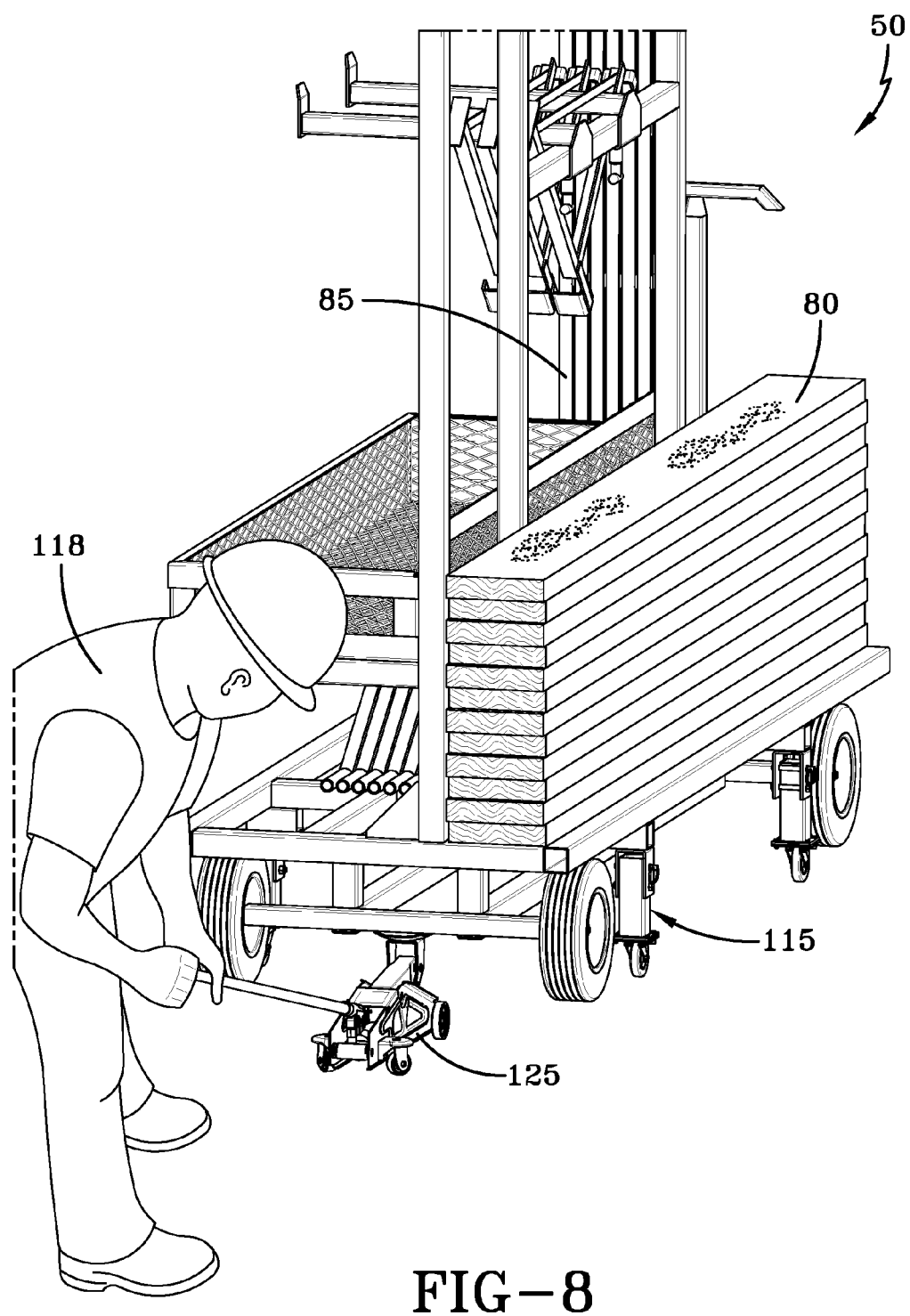
FIG. 8 represents one exemplary technique for raising a front end of the scaffolding transport cart of FIGS. 4-6 for the purpose of clearing a door threshold, step, etc., while the cart is in use.

Extension of the casters 115 may be accomplished in several ways. A simplistic technique is illustrated in FIG. 8, where a user 118 manually raises the scaffolding transport cart 50 from one end using a hydraulic jack 125 or a similar lifting device, and then extends and locks some or all of the casters 115 while the cart is in the raised position. This process may need to be repeated from the other end of the scaffolding transport cart 50 in order to extend all of the casters 115. In alternate embodiments, the casters 115 may be powered by linear actuators, motor and ball screw assemblies, etc., such that the casters can be extended to themselves raise the scaffolding transport cart 50 as described above. In yet another embodiment, the casters 115 may include a screw assembly that allows the casters to be manually extended by turning a handle or a similar mechanism, in the manner of a trailer jack or the like.

Figure 9:
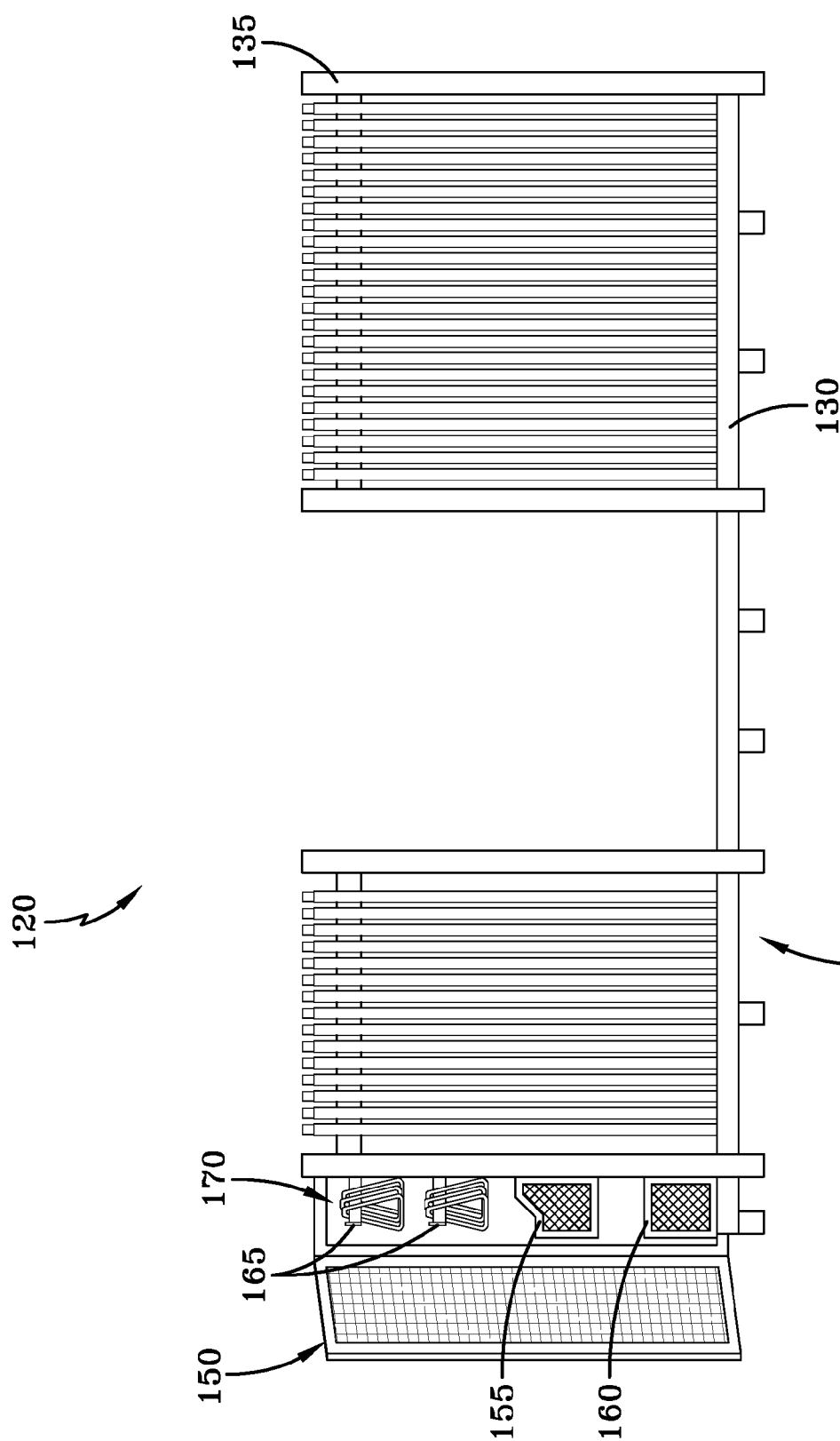
FIG. 9 is a schematic side view of one exemplary embodiment of a supported use scaffolding transport cart.
Figure 10:
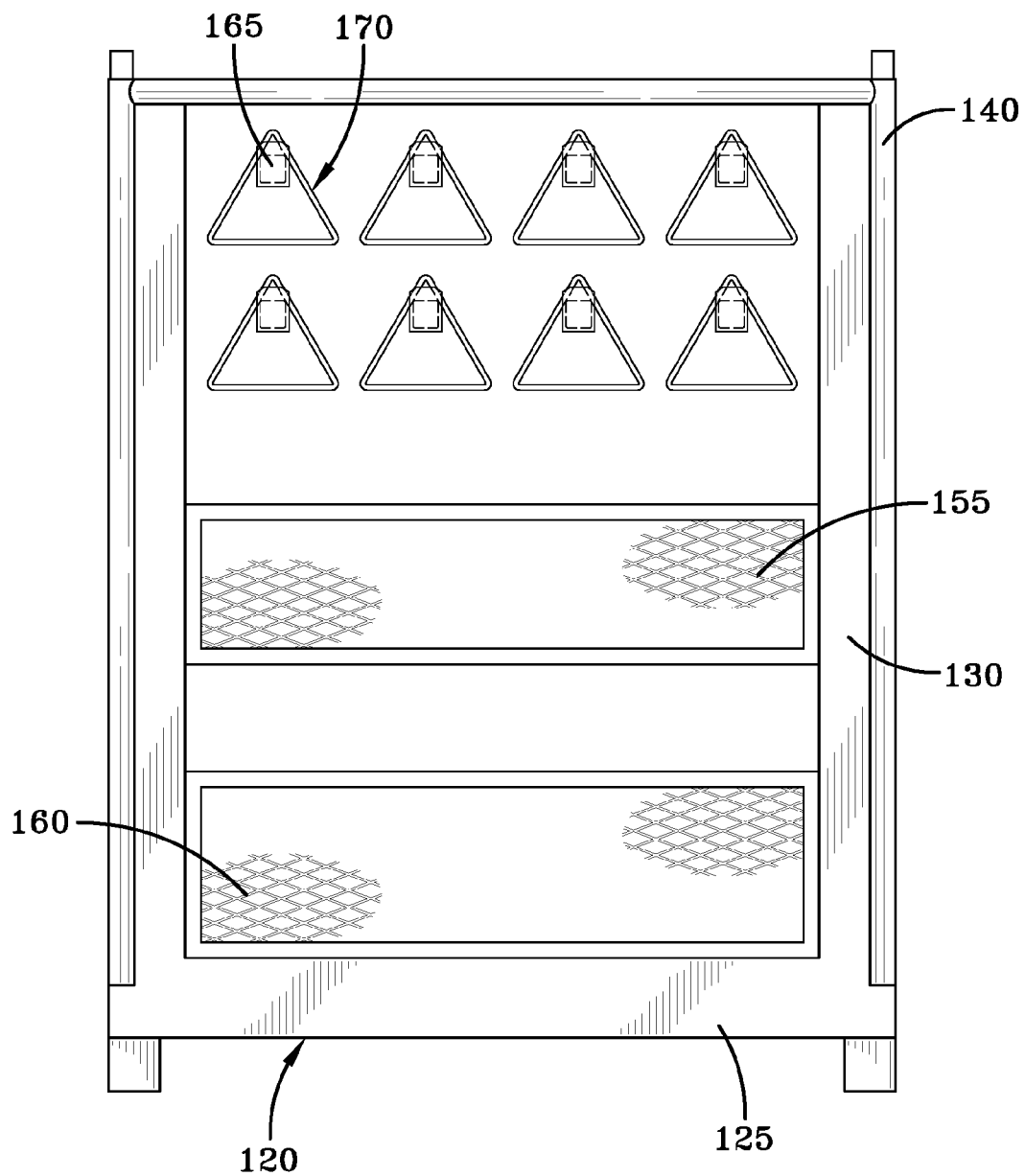
FIG. 10 is a front end view of the scaffolding transport cart of FIG. 9.
Figure 11:
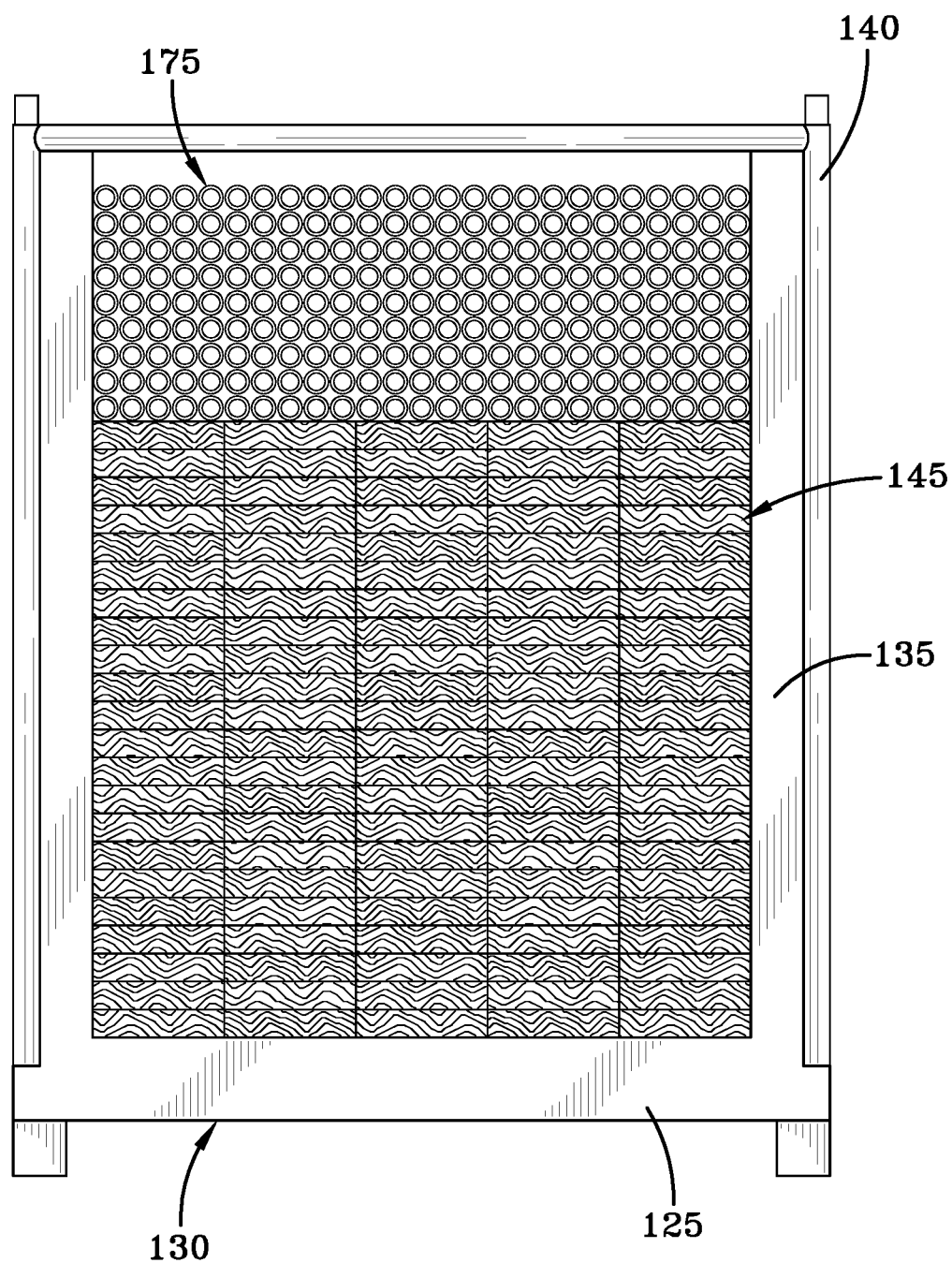
FIG. 11 is a rear end view of the scaffolding transport cart of FIG. 9.

Yet another exemplary scaffolding transport cart embodiment 120 is illustrated in FIGS. 9-11. This scaffolding transport cart 120, like the exemplary scaffolding transport carts 5, 50 of FIGS. 1-3 and FIGS. 4-8, is designed to support, retain and transport various scaffolding components. Unlike the exemplary scaffolding transport carts 5, 50 of FIGS. 1-3 and FIGS. 4-8, however, the scaffolding transport cart 120 of FIGS. 9-11 is designed to be transported in/on and unloaded from a truck, and thereafter transferred to a scaffolding erection site using another device such as a forklift. Consequently, the scaffolding transport cart is referred to herein as a supported use scaffolding transport cart. Typically, a supported use scaffolding transport cart like that depicted in FIGS. 9-11 will be much larger than a manual use scaffolding transport cart like that of FIG. 1-3 or 4-8, and may find use in larger jobs where there are fewer or no barriers that prevent passage of such a cart. For example, an exemplary supported use scaffolding transport cart may substantially mimic the dimensions (or at least the width dimension) of a typical flatbed truck or other known transport vehicle.

Referring to FIGS. 9-11, the supported use scaffolding transport cart 120 includes a frame 125 having both base members 130 and upright members 135. The overall dimensions and shape of the assembled frame 125 are such that scaffolding frame sections 140 may be hung over the scaffolding transport cart frame and retained until deliberately removed, as may be best observed in FIGS. 10-11.

As depicted in FIG. 9, the assembled scaffolding transport cart framework may include an opening through which a forklift may load scaffolding planks 145 (see FIG. 11) onto the cart 120. Likewise, an underside of the base portion of the scaffolding transport cart 120 may include openings or pockets in which are received the forks of a forklift. The scaffolding transport cart 120 may also include a hinged door 150 at one or both ends that permits endwise access into the cart and to the scaffolding components contained therein when desired, while also ensuring that said scaffolding components remain within the cart during transport.

Referring now to FIG. 10, it can be observed that a forward interior end of this exemplary scaffolding transport cart 120 includes a space containing a pair of baskets 155, 160 for storing various scaffolding components, such as but not limited to those mentioned above. The forward interior end of this exemplary scaffolding transport cart 120 also includes a plurality of outrigger hanging arms 165 from which a multitude of scaffolding outriggers 170 are hung.

Referring now to FIG. 11, it can be observed that a rearward interior end of this exemplary scaffolding transport cart 120 includes a space within which a plurality of scaffolding planks 145 are stacked. The rearward interior end of this exemplary scaffolding transport cart 120 also includes a space within which a number of cross-braces 175 may be stacked or hung from cross-brace hanging arms (not shown).

Figure 12:
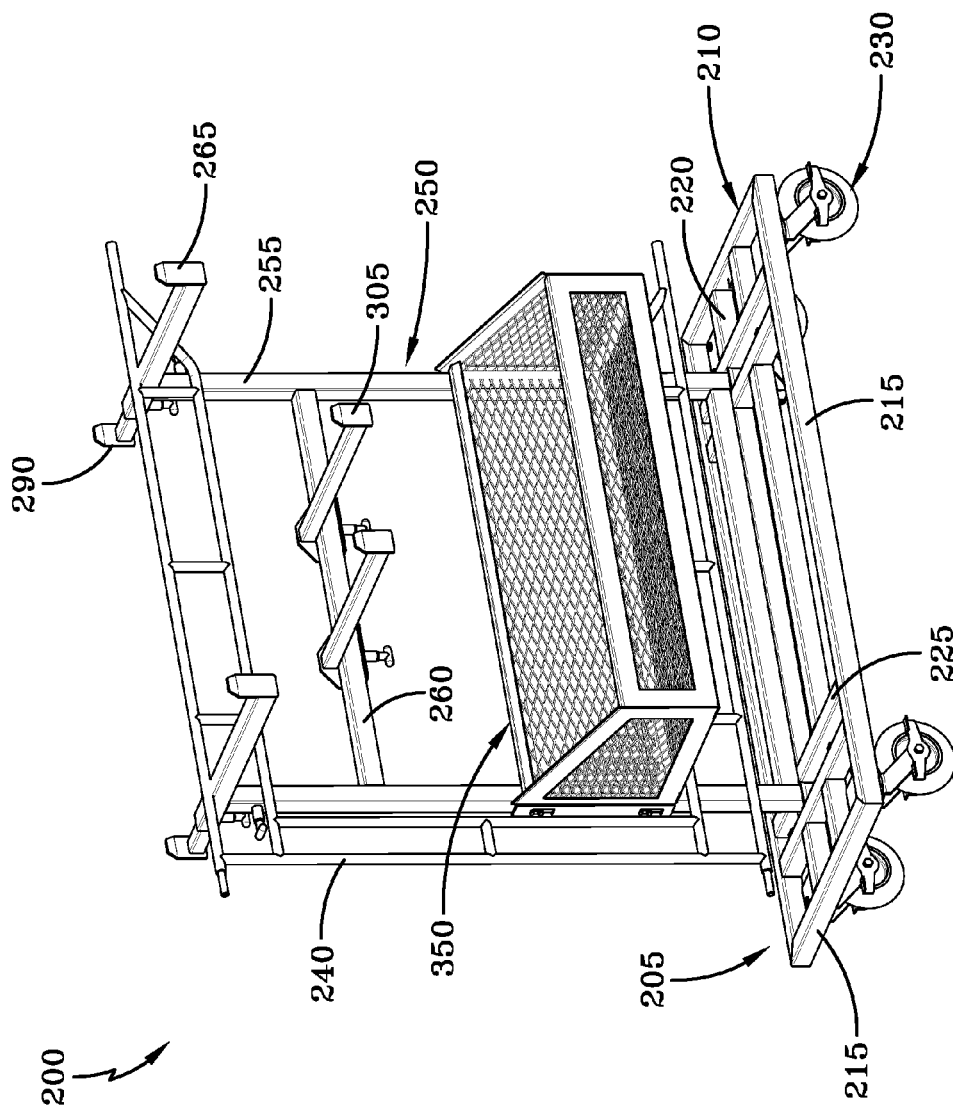
FIG. 12 is an isometric elevation view of another exemplary manual use scaffolding transport cart.
Figure 13:
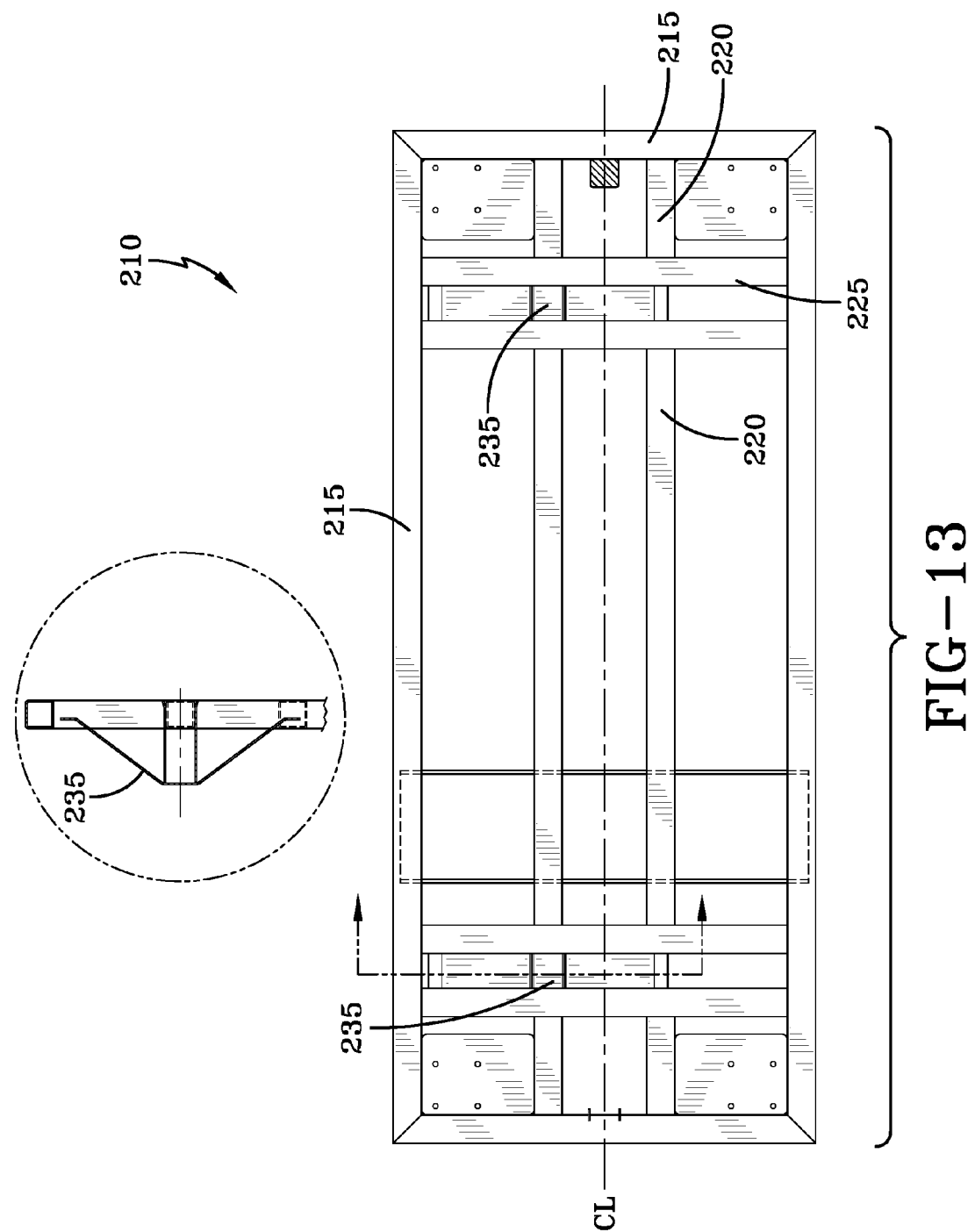
FIG. 13 is a manufacturing drawing for an exemplary base frame of the exemplary cart of FIG. 12.
Figure 14:
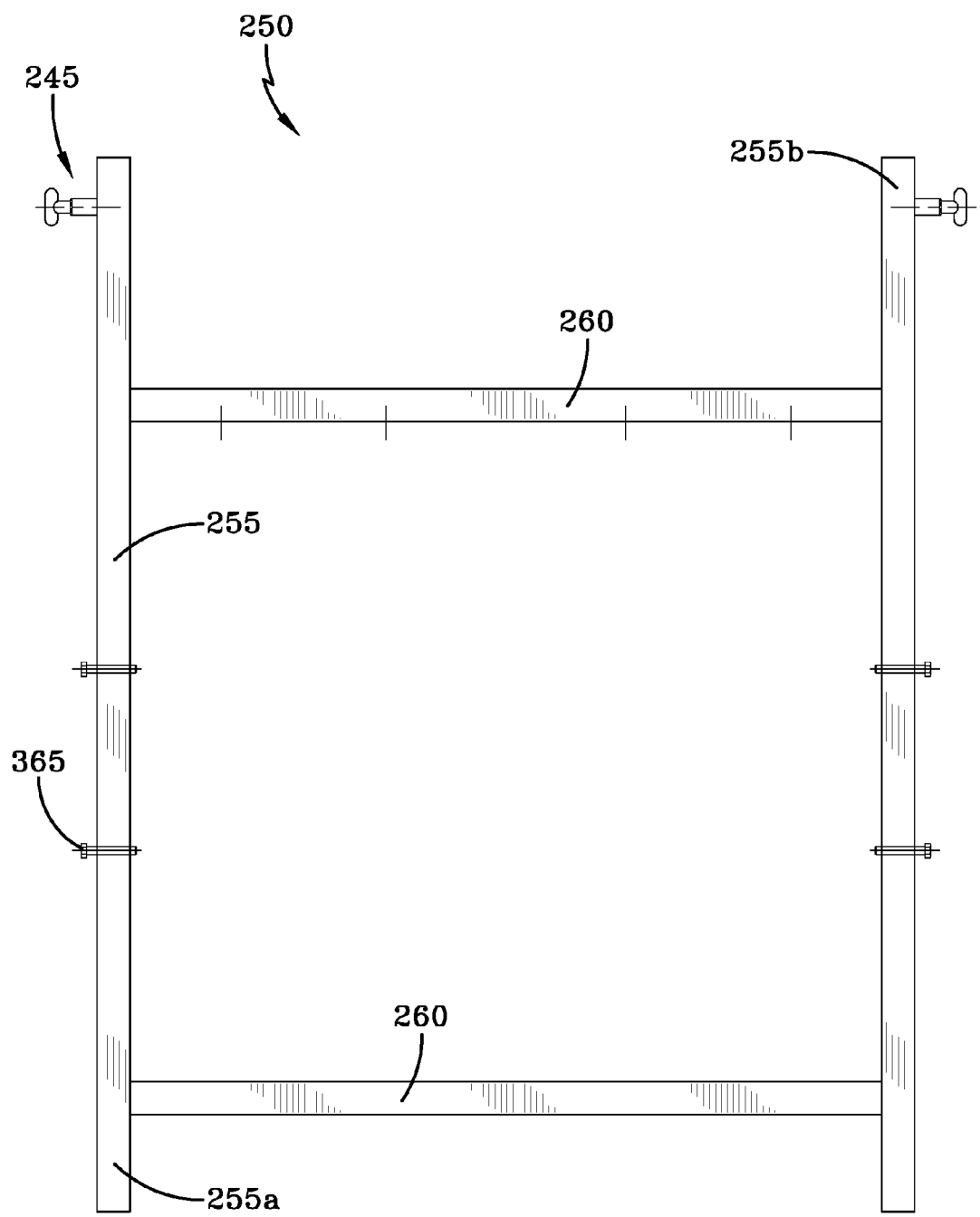
FIG. 14 is a manufacturing drawing for an exemplary upright center rack frame designed to engage the base frame of FIG. 13.

Still another exemplary embodiment of a scaffolding transport cart 200 is illustrated in the assembled view of FIG. 12, as well as the manufacturing drawings of FIGS. 13-15. This particular scaffolding transport cart design is once again referred to herein as a manual use scaffolding cart—meaning only that the cart is designed to be moved and guided, or at least guided, by a user of the cart. Like the exemplary scaffolding transport carts 5, 50, this scaffolding transport cart 200 is also designed to fit through a typical doorway even when loaded.

The scaffolding cart 200 is similar in design to the scaffolding carts 5, 50 of FIGS. 1-3 and 4-8, except that the scaffolding cart of FIG. 12 is more streamlined and generally modular in nature. The scaffolding transport cart 200 of FIG. 12 includes a framework 205 that is similar to the frameworks of the scaffolding transport carts 5, 50 of FIGS. 1-3 and 4-8. That is, the scaffolding transport cart 200 again includes a substantially horizontally-oriented base frame 210, and an upright center rack frame 250 that is supported on and extends upward from the base frame.

The base frame 210 may be of various designs and constructions. As shown, the base frame 210 may include a plurality of perimeter frame members 215 that, when joined, establish the length and width boundaries of the base frame. Various ones of the perimeter frame members 215 may be connected by lengthwise-directed and/or width-wise directed cross-members 220, 225. The cross-members 220, 225 may be provided for a number of purposes including, without limitation, to strengthen the base frame 210, to provide support for the upright center rack frame 250, and to provide support for scaffolding components such as, but not limited to, planks. The perimeter frame members 215 and the cross-members may be joined or otherwise secured to one another by any technique known to one of skill in the art, including but not limited to, welding and the use of threaded fasteners.

To the base frame 210 are also attached a plurality of wheel and tire assemblies 230, which allow for easy movement of the scaffolding transport cart 200. In this exemplary embodiment, each of the wheel and tire assemblies 230 is provided substantially in the form of a pneumatic tire caster and, therefore, includes its own axle. In this example, two of the wheel and tire assemblies 230 along a leading or trailing end of the cart 200 swivel, while the two remaining wheel and tire assemblies are fixed. This combination of swiveling and fixed wheel and tire assemblies 230 allows the scaffolding transport cart 200 to be easily directed during movement thereof. The wheel and tire assemblies 230 of the exemplary scaffolding transport cart 200 may be different in other embodiments, and could also be replaced with other wheels, tracks, skis, etc.

The upright center rack frame 250 is designed for easy installation to and removal from the base frame 210. In this exemplary embodiment, the base frame 210 includes center rack frame mounting pockets 235 that releasably receive and retain the upright center rack frame without the need for fasteners or other additional retention elements. As shown, the location of the center rack frame mounting pockets 235 may be offset from the lengthwise centerline of the base frame 210 to facilitate the carrying of a plurality of scaffolding frame sections 240 within the bounds of the base frame perimeter, as is described in more detail below.

The upright center rack frame 250 may be of various designs and constructions. As shown, the upright center rack frame 250 may include a two (or more) upright frame members 255 that may be joined by two or more cross-members 260. As may be best observed in FIG. 14, proximal ends 255a of the upright frame members 255 of this exemplary upright center rack frame 250 extend beyond a lower cross-member 260 to engage the center rack frame mounting pockets 235 in the base frame 210. The upright frame members 255 and cross-members 260 of the upright center rack frame 250 combine to create a rigid frame capable of maintaining an upright posture while supporting a number of scaffolding frame sections 240 and/or other scaffolding components.

Both the base frame 210 and the upright center rack frame 250 are again particularly adapted to support, retain and transport various scaffolding components. In this exemplary embodiment, it can be seen that the base frame 210 of the scaffolding transport cart 200 is again designed to receive and support scaffolding planks (not shown) much like the scaffolding carts of FIGS. 1-3 and 4-8.

It can also be observed in FIG. 12 that the upright center rack frame 250 is adapted to receive substantially horizontally-oriented scaffolding frame hanging arms 265, 290 from which multiple scaffolding frame sections 240 may be hung. When installed, a set of first frame hanging arms extend from one side of the upright center rack frame 250 and a set of second frame hanging arms 290 extend from an opposite side of the upright center rack frame and in an opposite direction to that of the set of first frame hanging arms 265. Consequently, this exemplary scaffolding transport cart can support scaffolding frame sections 240 along both sides of the upright center rack frame 250 (as is shown with respect to the scaffolding cart of FIG. 5).

Figure 15A:
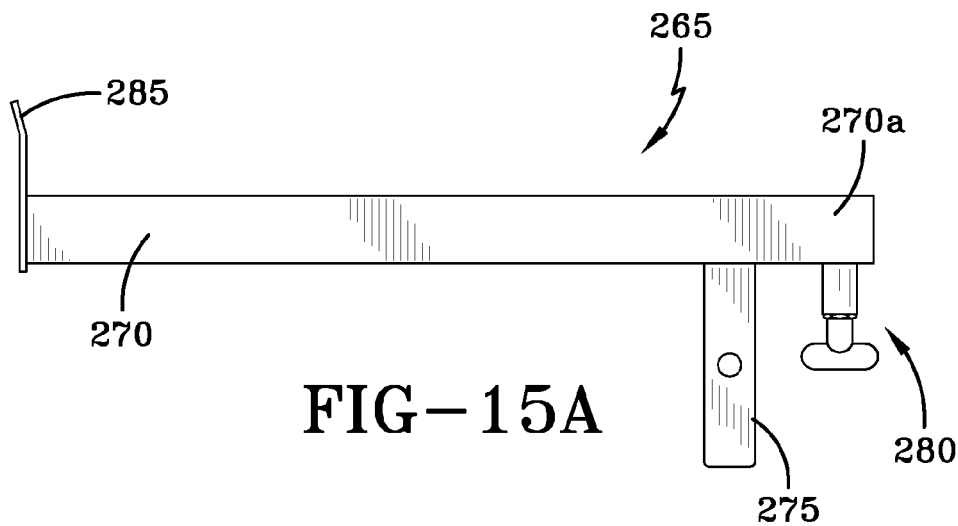
FIGS. 15A-15C is a manufacturing drawing depicting various exemplary cart hanger and/or support arms that may be attached to an exemplary center rack frame such as that shown in FIG. 14.
Figure 15B:
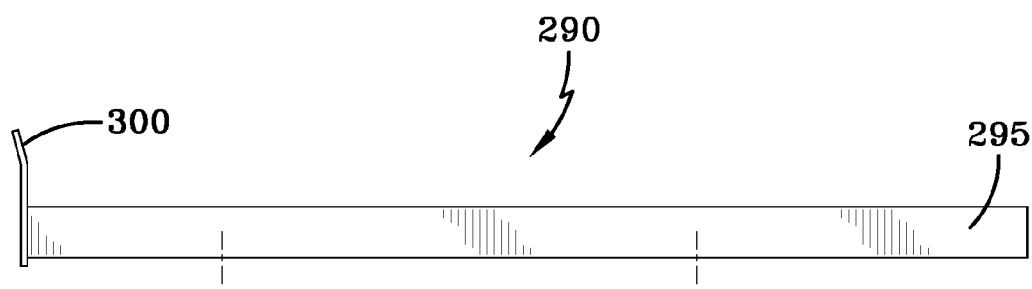

Exemplary embodiments of the first and second scaffolding frame hanging arms 265, 290 may be observed in FIGS. 15A-15B. As shown in FIG. 15A, a first scaffolding frame hanging arm 265 may include a scaffolding frame support member 270 to which is joined a mounting member 275 adapted to releasably attach the first scaffolding frame hanging arm 265 to the upright center rack frame 250. In this example, the mounting member 275 is a section of tubing dimensioned to fit within an open distal end of an upright member 255 of the upright center rack frame. A retention device 245 may be provided on each upright member 255 of the upright center rack frame 250 for securing the mounting member 275 of the associated first scaffolding frame hanging arm 265 therein. The retention device 245 may utilize, for example, a threaded fastener that is tightened against the first scaffolding frame hanging arm mounting member 275, or a spring-loaded pin that passes through a receiving hole in the first scaffolding frame hanging arm mounting member. A stop element 285 may be installed to the distal end of the scaffolding frame support member 270 of the first scaffolding frame hanging arm 265 to prevent scaffolding frame members from sliding off of the first scaffolding frame hanging arms.

The exemplary second scaffolding frame hanging arm 290 shown in FIG. 15B may also include a scaffolding frame support member 295. In this example, the frame support member 295 is a section of tubing dimensioned to fit within an open proximal end 270a of scaffolding frame support member 270 of the first scaffolding frame hanging arm 265 when the scaffolding frame hanging arms are installed to the upright center rack frame 250. Consequently, the frame support member 295 of the second scaffolding frame hanging arm 290 is telescopically arranged within the frame support member 270 of the first scaffolding frame hanging arm 265. A retention device 280 may be provided on the frame support member 270 of the first scaffolding frame hanging arm 265 for securing a portion of the frame support member 295 of the second scaffolding frame hanging arm 290 therein. The retention device 245 may again utilize, for example, a threaded fastener that is tightened against the frame support member 295 of the second scaffolding frame hanging arm 290, or a spring-loaded pin that passes through a receiving hole in the frame support member of the second scaffolding frame hanging arm. A stop element 300 may be installed to the distal end of the scaffolding frame support member 295 of the second scaffolding frame hanging arm 290 to prevent scaffolding frame members from sliding off of the second scaffolding frame hanging arms.

The exemplary scaffolding transport cart 200 may be further equipped with a set of secondary hanging arms 305 that may extend substantially horizontally from either side of the upright center rack frame 250 at a location between the base frame 210 and the sets of first and second scaffolding frame hanging arms 265, 290. More particularly, the secondary hanging arms 305 are preferably positioned such that items supported thereby will reside within an open area of a typical scaffolding frame member 240 when such a scaffolding frame member is hung from the scaffolding frame hanging arms 265, 290 as shown in FIG. 12. The secondary hanging arms 305 may be used, for example, to support scaffolding outriggers (see, e.g., FIGS. 4-6).

Figure 15C:
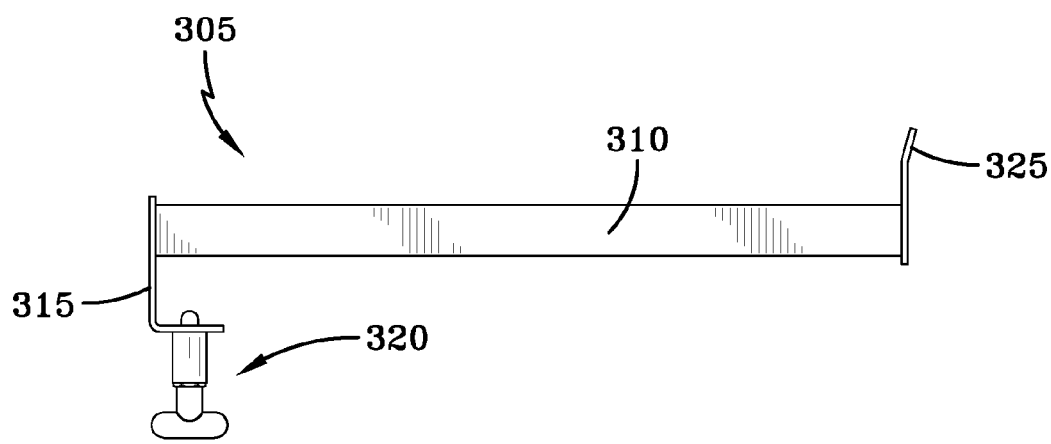

An exemplary secondary hanging arm 305 shown in FIG. 15C. The secondary hanging arm 305 again includes a scaffolding component support member 310 (e.g., an outrigger support member). A mounting member 315 is joined to the scaffolding component support member 310 and adapted to releasably attach the secondary hanging arm 305 to the upright center rack frame 250. In this particular example, the mounting member 315 is a bracket that is adapted to releasably attach the secondary hanging arm 305 to a horizontal cross-member 260 of the upright center rack frame 250. A retention device 320 may be provided on the bracket 315 for securing the secondary hanging arm 305 to a cross-member 260 of the upright center rack frame 250. The retention device 320 may utilize, for example, a threaded fastener that is tightened against the cross-member 260 of the upright center rack frame 250, or a spring-loaded pin that passes through a receiving hole in the cross-member of the upright center rack frame. A stop element 325 may be installed to the distal end of the scaffolding component support member 310 of the secondary hanging arm 305 to prevent outriggers or other scaffolding components from sliding off of the secondary hanging support arms.

Figure 16:
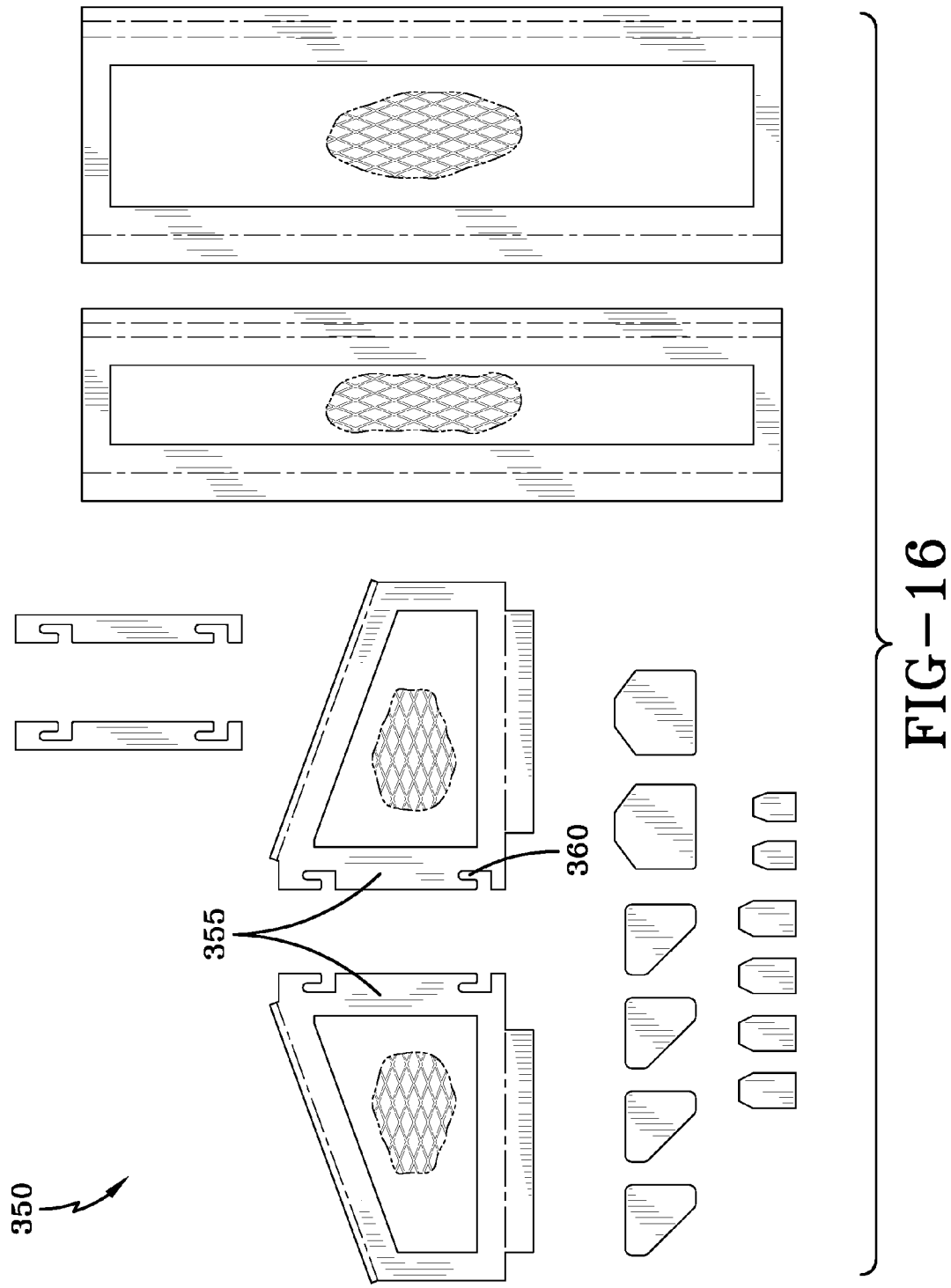
FIG. 16 is a manufacturing drawing depicting various components of an exemplary basket designed to hang from an exemplary upright center rack frame such as that shown in FIG. 14.

The exemplary scaffolding transport cart 200 may also be equipped with a basket 350 that can be used to store any of a variety of scaffolding components and/or other items, such as but not limited to safety pins, tie wire, etc. The basket 350 may be of various sizes, configurations and constructions. The basket 350 of this exemplary cart embodiment is designed to hang from the upright center rack frame 250. Hanging of the basket 350 may be accomplished in various ways. In this exemplary embodiment, the upright center rack frame 250 and end panels 355 of the basket 350 can be seen to be adapted for engagement that allows for secure but releasable hanging of the basket from the upright center rack frame. More specifically, and as may be best observed by reference to FIGS. 12 and 16, in this exemplary embodiment, the upright members 255 of the upright center rack frame 250 include pins 365 that extend from the sides thereof, and the end panels 355 of the basket 350 include hook-shaped recesses 360 that engage with the pins to releasably but securely hang the basket from the upright center rack frame. Other mechanisms for supporting a basket on an upright center rack frame may be utilized in other embodiments.

The plank storage space on the base frame 210, the height and horizontal separation of the frame hanging arms 265, 290, and the height and arrangement of the secondary hanging arms 305, are all selected specifically to permit the support and retention of the scaffolding components associated therewith. Similarly, the dimensions of the base frame 210, and the extension distance of the frame hanging arms 265, 290 and secondary hanging arms 305 is selected such that the scaffolding transport cart 200 will fit through a typical doorway even when fully loaded with scaffolding components.

Although not shown in FIG. 12, the exemplary scaffolding transport cart embodiment 200 may also again include a handle that facilitates user movement and steering of the cart. The handle may be attached to various points on the scaffolding transport cart 200. Other devices for facilitating user movement of a scaffolding transport cart may be employed in other embodiments. For example, the scaffolding transport cart 200 may be powered, such as by a motor or engine and an associated drive means, that provides for powered movement of the cart under user control. The scaffolding transport cart 200 may alternatively be adapted for releasable connection to a secondary device, such as a powered tugger or pusher, or to some other powered vehicle that can produce a desired movement of the cart and then be disconnected therefrom, as described above.

The exemplary scaffolding transport cart 200 represented by FIGS. 12-16 is modular in nature. That is, the base frame 210, the upright center rack frame 250, the scaffolding frame hanging arms 265, 290, the secondary hanging arms 305, and even the basket 350, are designed to be used interchangeably. For example, a different upright center rack frame may be easily installed to the base frame 210. Similarly, the scaffolding frame hanging arms 265, 290, the secondary hanging arms 305 and the basket 350 may be releasably attached to a different upright center rack frame. Each or all of the upright center rack frame 250, scaffolding frame hanging arms 265, 290, secondary hanging arms 305, and basket 350, may also be associated with a different base frame. As may be understood from the foregoing description, the interchange of said components may be easily and efficiently accomplished.

It should be realized that exemplary scaffolding transport cart embodiments described generally or in detail herein may share similar elements and/or features. Additionally, a given scaffolding transport cart embodiment may be designed to retain, support and transport scaffolding components in a variety of arrangements. That is, a given scaffolding transport cart embodiment is not limited to the particular arrangement of scaffolding components shown and described herein.

Therefore, while certain exemplary embodiments are described in detail above, the scope of the invention is not considered limited by such disclosure, and modifications are possible without departing from the spirit of the invention as evidenced by the following claims:

What is claimed is:

1. A manual use scaffolding transport cart, comprising:
    a base frame;
    an upright frame extending upward from the base frame;
    a plurality of wheels associated with the base frame for facilitating user movement of the cart; and
    a first set of hanging elements extending from the upright frame, the first set of hanging elements configured and dimensioned to suspend scaffolding frame sections in a vertical orientation above the base frame, and including:
        a first scaffolding frame support member, and
        a mounting member joined to and extending substantially transversely from the first scaffolding frame support member, the mounting member adapted to releasably attach the first scaffolding frame support member to the upright frame by fitting into an open distal end of an upright member of the upright frame;
    wherein the frames and the first set of hanging elements are dimensioned such that the assembled cart will fit through a standard doorway.

2. The cart of claim 1, further comprising a second set of hanging elements extending from the upright frame, the second set of hanging elements configured and dimensioned to suspend scaffolding outriggers in a vertical orientation above the base frame.

3. The cart of claim 2, wherein the second set of hanging elements is removably attached to the upright frame.

4. The cart of claim 2, wherein the first set of hanging elements and the second set of hanging elements extend from opposite sides of the upright frame.

5. The cart of claim 2, wherein the first set of hanging elements and the second set of hanging elements extend from the same side of the upright frame, and wherein the second set of hanging elements is positioned such that scaffolding outriggers suspended therefrom will be located within a void in scaffolding frame sections suspended from the first set of hanging elements.

6. The cart of claim 1, wherein the first set of hanging elements is removably attached to the upright frame.

7. The cart of claim 1, wherein the upright frame is removably attached to the base frame.

8. The cart of claim 1, further comprising:
    an open proximal end in the first scaffolding frame support member;
    a second scaffolding frame support member, the second scaffolding frame support member dimensioned to fit within the open proximal end in the first scaffolding frame support member; and
    a retention device associated with the first scaffolding frame support member for securing a portion of the second scaffolding frame support member within the first scaffolding frame support member;
    wherein, when the second scaffolding frame support member is secured within the first scaffolding frame support member, scaffolding frame sections are simultaneously suspendable from the first set of hanging elements along opposite sides of the upright frame.

9. The cart of claim 1, further comprising a substantially planar support surface located along a top face of the base frame and to one side of the upright frame, the support surface of sufficient length to support standard scaffolding planks.

10. The cart of claim 1, wherein the wheels are comprised of wheel and tire assemblies.

11. The cart of claim 1, further comprising a handle configured and positioned to facilitate manual movement of the cart using the handle.

12. The cart of claim 1, further comprising a motor and drive means coupled to one or more of the wheels and configured to move the cart under the command of an operator.

13. The cart of claim 1, further comprising at least one basket supported on the upright frame.

14. The cart of claim 1,
    wherein the frames and the first and second sets of hanging elements are dimensioned such that the assembled cart will fit through a standard doorway while carrying scaffolding frame sections and scaffolding outriggers.

15. A manual use scaffolding transport cart, comprising:
    a base frame;
    an upright frame extending upward from the base frame;
    a plurality of wheels associated with the base frame for facilitating user movement of the cart;
    a first set of hanging elements extending from the upright frame, the first set of hanging elements configured and dimensioned to suspend scaffolding frame sections in a vertical orientation above the base; and
    a set of extendable wheels or casters for facilitating cart rotation, the set of wheels or casters underlying but affixed to the base frame and being selectively extendable to raise the height of the base frame to a level at which the wheels of the cart are no longer in contact with the ground;
    wherein the frames and the first set of hanging elements are dimensioned such that the assembled cart will fit through a standard doorway.

16. The cart of claim 15, wherein one or more of the upright frame, first set of hanging elements and second set of hanging elements is removably attached to the upright frame.

17. The cart of claim 15, further comprising a substantially planar support surface located along a top face of the base frame and to one side of the upright frame, the support surface of sufficient length to support standard scaffolding planks.

18. The cart of claim 15, wherein the first set of hanging elements includes:
    a first scaffolding frame support member; and
    a mounting member joined to and extending substantially transversely from the first scaffolding frame support member, the mounting member adapted to releasably attach the first scaffolding frame support member to the upright frame by fitting into an open distal end of an upright member of the upright frame.

19. The cart of claim 15, further comprising a motor and drive means coupled to one or more of the wheels and configured to move the cart under the command of an operator.

* * * * *